United States Patent [19]

Wismer et al.

[11] 3,953,622

[45] Apr. 27, 1976

[54] METHOD OF FORMING A NON-GLOSSY FILM

[75] Inventors: Marco Wismer, Gibsonia; Earl E. Parker, Allison Park, both of Pa.

[73] Assignee: PPG Industries, Inc., Pittsburgh, Pa.

[22] Filed: Apr. 3, 1974

[21] Appl. No.: 457,336

Related U.S. Application Data

[63] Continuation-in-part of Ser. No. 135,815, April 20, 1971, abandoned.

[52] U.S. Cl. ................................ 427/54; 427/170; 427/380
[51] Int. Cl.² .................. B44D 1/44; C03H 19/00; C08K 1/82
[58] Field of Search .............. 117/93.31, 62, 47, 72; 204/159.15; 427/54, 170, 380

[56] References Cited
UNITED STATES PATENTS

| | | | |
|---|---|---|---|
| 2,963,747 | 12/1960 | Brown | 117/93.31 |
| 3,051,585 | 8/1962 | Weinberg et al. | 117/72 |
| 3,129,110 | 4/1964 | Anderson | 117/72 |
| 3,166,434 | 1/1965 | Gauger | 117/72 |
| 3,188,265 | 6/1965 | Charbonneau et al. | 117/93.31 |
| 3,246,054 | 4/1966 | Guenther et al. | 204/159.19 |
| 3,359,129 | 12/1967 | Mao | 117/93.31 |
| 3,499,781 | 3/1970 | Knueckel | 117/72 |
| 3,531,317 | 9/1970 | Patheiger | 204/159.15 |
| 3,531,547 | 9/1970 | Hazen et al. | 117/72 |
| 3,546,002 | 12/1970 | Radlove et al. | 117/93.31 |
| 3,582,487 | 6/1971 | Fuhr et al. | 204/159.15 |
| 3,669,716 | 6/1972 | Keyl et al. | 117/62 |

*Primary Examiner*—Bernard D. Pianalto
*Attorney, Agent, or Firm*—George D. Morris

[57] ABSTRACT

A novel method of preparing a strong, non-glossy pigmented material comprises subjecting a composition comprising an ethylenically unsaturated polyester, an ethylenically unsaturated monomer and a peroxide catalyst to at least enough actinic light to gel the composition and coating the hardened polyester composition with a coating composition comprising an ethylenically unsaturated polyester, an ethylenically unsaturated monomer, ultraviolet light absorbing pigment, and optionally an accelerator, and subjecting the coating to actinic light to cure the coating to a non-glossy pigmented material.

8 Claims, No Drawings

METHOD OF FORMING A NON-GLOSSY FILM

CROSS-REFERENCE TO RELATED APPLICATION

This application is a continuation-in-part of application Ser. No. 135,815, filed Apr. 20, 1971, now abandoned.

A method of forming films and coatings having good strength, mar resistance, wear resistance, and stain resistance is that of subjecting unsaturated polyester resins to actinic light to cure the resins. This method of irradiating with actinic light to cure polyester resins is advantageous as the rate of crosslinking achieved thereby is unobtainable by most other methods.

The prior art method of heat-curing a pigmented polyester resin catalyzed with a peroxide has produced glossy films. It has been found also that the actinic light treatment of unpigmented polyester resins results in glossy films. This is desirable in some cases but in many cases it is necessary to achieve a coating which is flat or has a low gloss. Thus, a satisfactory method of producing a non-glossy polyester resin film has been heretofore unavailable.

In copending application Ser. No. 135,797, filed Apr. 20, 1971, we disclose a novel method of obtaining low gloss materials by treating a composition comprising an unsaturated polyester, an ethylenically unsaturated monomer, and a peroxide catalyst with actinic light to cure.

The novel method of this invention is an improvement over the invention in said copending application Ser. No. 135,797, in that a more stable polyester resin composition may be prepared prior to the final curing step.

This method entails first subjecting a composition comprising an ethylenically unsaturated polyester, an ethylenically unsaturated monomer and a peroxide catalyst to at least enough actinic light to harden the composition or gel the composition. The hardened or gelled composition may then be coated with a composition comprising an ethylenically unsaturated polyester, an ethylenically unsaturated monomer and ultraviolet light absorbing pigment but without catalyst to produce a stable material which will not readily gel at room temperature. This composition may then be cured by subjecting to actinic light wherein the peroxide catalyst will migrate through the base composition to the coating composition and effect a cure to a non-glossy state.

The above composition must be at least gelled to a state wherein the surface is hard enough so that it will not intermix with the wet coating composition. However, the method of this invention may be carried out even when the base composition is completely cured to a solvent resistant state.

It is noted that the migration of the catalyst through the hardened polyester composition is quite surprising and the mechanics of this migration are not known.

The unsaturated polyesters used herein are polyesters of an alpha,beta-ethylenically unsaturated polycarboxylic acid and a polyhydric alcohol.

The ethylenically unsaturated polycarboxylic acids include such acids as:
  maleic acid
  fumaric acid
  aconitic acid
  mesaconic acid
  citraconic acid
  itaconic acid
and halo and alkyl derivatives of such acids and the like; the preferred acid being maleic acid. The anhydrides of these acids, where the anhydrides exist, are of course, embraced under the term "acid", since the polyesters obtained therefrom are essentially the same whether the acid or anhydride is utilized in the reaction. The ethylenically unsaturated dicarboxylic acids are conventionally employed in an amount of about 10 to about 100 mol percent, although preferably in an amount of about 20 to about 80 mol percent of the total mols of acid component in the polyester.

The polyhydric alcohols useful in preparing unsaturated polyester resins include:
  ethylene glycol
  diethylene glycol
  triethylene glycol
  polyethylene glycol
  propylene glycol
  dipropylene glycol
  polypropylene glycol
  glycerol
  neopentyl glycol
  pentaerythritol
  trimethylol propane
  trimethylol ethane
and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyester resins. Such acids increase the length of the polyester without adding additional crosslinking sites, which is a desired feature in some polyesters. Examples of useful dicarboxylic acids which are either saturated or only aromatically unsaturated include:
  succinic acid
  adipic acid
  suberic acid
  azelaic acid
  sebacic acid
  phthalic acid
  isophthalic acid
  terephthalic acid
  tetrachlorophthalic acid
  hexachloroendomethylenetetrahydrophthalic acid
and the like. As in the case of the ethylenically unsaturated acids, the anhydrides of these acids, where the anhydrides exist, are, of course, embraced in the term acid, since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Examples of polymerizable ethylenically unsaturated vinyl monomers which are blended with the modified unsaturated polyesters are:
  styrene alpha-methyl styrene
divinyl benzene
vinyl acetate
methyl acrylate
methyl methacrylate
hexyl acrylate
octyl acrylate
octyl methacrylate and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester components. The amount of monomer should be sufficient to provide a liquid, flowable, interpolymerizable mixture. Ordinarily, the percentage of monomer will fall within the range of about 10 to about 60 percent by weight of the total mixture of polyester and monomer. At the preferred range, the monomer is present in an amount of about 20 to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100°C. to about 120°C., which is sufficiently high, in the absence of gelation inhibitors, to induce premature gelation upon introduction of the monomer into the system. This is true even in the absence of free-radical catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include:
  p-benzoquinone
  chloranil
  hydroquinone
  3-isopropyl catechol
  4-t-butyl catechol
  3-methyl catechol
  4-ethyl catechol
  4-isopropyl catechol
and the like.

The following are representative examples of halide salts of amines which may be employed as inhibitors:
  trimethylamine hydrochloride
  trimethylamine hydrobromide
  dimethylaniline hydrochloride
  triethylamine hydrochloride
  tri-n-butylamine hydrochloride
  tribenzylamine hydrobromide
  N-benzylaniline hydrochloride
and the like. Useful quaternary ammonium salts include:
  trimethyl benzyl ammonium acid oxalate
  trimethyl benzyl ammonium chloride
  di (trimethyl benzyl ammonium) oxalate
  trimethyl benzyl ammonium maleate
  trimethyl benzyl ammonium tartrate
and the like. Other useful ammonium compounds and amine halide compounds are disclosed in U.S. Pat. Nos. 2,593,787 and 2,646,416, respectively. The quaternary ammonium salts or amine halide salts represent a preferred type of inhibitor for utilization with the novel accelerator system of this invention, although satisfactory results are also achieved when phenolic inhibitors or quinonic inhibitors are utilized.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conveniently is in a range of about 0.001 to about 0.1 percent by weight, based upon the polyester component of the mixture. Interpolymerizable mixtures of polyesters of alpha, beta-ethylenically unsaturated dicarboxylic acids and monomers containing an inhibitor, as above described, may be stored over substantial periods of time, for example, several weeks or even months, without premature gelation.

The peroxide catalyst for the polyesters are organic peroxides and organic hydroperoxides or esters thereof. Typical organic peroxides useful as catalysts for unsaturated polyester resins include:
  benzoyl peroxide
  acetyl peroxide
  lauroyl peroxide
  methyl ethyl ketone peroxide
  cyclohexanone peroxide
and the like.

Organic hydroperoxides or their esters with carboxylic acids useful as catalysts for unsaturated polyester resins include:
  cumene hydroperoxide
  tertiary butyl hydroperoxide
  ditertiary butyl perphthalate
  methyl ethyl ketone peroxide
  1-hydroxycyclohexyl hydroperoxide
and the like. For the purposes of this invention, the organic hydroperoxides represent a preferred class of catalysts, and best results have been obtained with methyl ethyl ketone peroxide.

Many other useful catalysts are disclosed in the monograph "Organic Peroxides" by A. V. Tovolsky and R. B. Mesrobian, copyrighted in 1954 by Interscience Publishers, Inc., New York, pages 158–163. These catalysts may be utilized in amounts of about 0.1 to about 5 percent by weight based upon the mixture of interpolymerizable materials. If the basecoat is to be cured to a greater degree, it may be desirable to use a higher amount of catalyst such as 10 percent or more.

The base coat may also contain photosensitizers to aid in the hardening of the base composition. Various common photosensitizers are benzoin, benzoin methyl ether, diphenyl disulfide, dibenzyl disulfide, benzil, and the like. Generally the coating may comprise from about 0.1 percent by weight of the photosensitizer to about 5 percent by weight of the photosensitizer.

The composition comprising the polyester, monomer, and peroxide catalyst is hardened or gelled by subjecting to actinic light. In general, the use of wave lengths in which sensitivity to actinic light occurs is approximately 1800 to 4000 angstrom units. Various suitable sources of the actinic light are available in the art including by way of example, quartz mercury lamps, ultra-violet cored carbon arcs, and high-flash lamps.

The length of exposure to the actinic light and the intensity of the source may be varied greatly. Treatment is continued at least until the composition is hardened enough so that it may be handled comfortably without problem of intermingling with the topcoat. The actual degree of the treatment varies from composition to composition.

The hardened base material is then coated with a composition comprising unsaturated polyester and ethylenically unsaturated monomers. The same or different polyester and monomer may be used as those used in the base material. The coating composition may also, if desired, contain accelerators for the room temperature catalystic cure of polyester resins such as tertiary aromatic amines such as dimethylaniline or dimethyl-p-toluidine are very effective promoters for diacyl peroxides such as benzoyl peroxide. Similarly, cobalt salts, such as cobalt naphthenate, are very effective promoters for ketone peroxides such as methyl ethyl ketone peroxide. The amount of promoter generally needed varies between about 0.1 and 5 weight-percent and preferably between about 0.2 and 0.5 weight-percent of the polyester-vinyl monomer mixture. The mixtures may be modified by the addition of fillers, pigments, and other materials, if desired.

In the case of the topcoat, although it may not be necessary in all cases, it is desirable to add a photosensitizer.

The composition, to get a more pronounced wrinkling effect thus reducing the gloss and an opaque appearance, may also contain highly ultraviolet light absorbing pigments such as titanium dioxide, benzidine yellow, para red, phthalo cyanine blue and phthalo cyanine green, and the like. It is noted that, although the pigments may be opaque to actinic light, the composition cures and has a flat finish. The best results are obtained using at least about 5 percent by weight of the flatting pigments. Other pigments which are not highly ultraviolet absorbing (60 percent) such as litharge and antimony oxide and the like may also be added.

The length of exposure and the intensity of the actinic light source used in the treatment of the topcoat is again subject to variation. The treatment, however, is continued until the composition is cured to a hard, non-glossy state. By this, it is meant that the film will be resistant to solvent attack and will be generally durable.

The method of this invention may be used to coat substrates with non-glossy polyester resins by merely applying the base coat and gelling and then applying the topcoat and subjecting to actinic light to cure in situ.

The coated substrates are quie useful as coatings for plywood paneling, cabinets, furniture, printed paper products, cement, and cement asbestor products, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A polyester resin was prepared as follows:

A vessel was charged with 980 grams of maleic anhydride, 1480 grams of phthalic anhydride, 1612 grams of propylene glycol, and 0.41 gram of methyl hydroquinone. The reactants were heated at a temperature of 210°C. for 7½ hours, the polyester had an acid number of 46.5 and a Gardner-Holdt viscosity of H. (60 percent in ethyl cellosolve).

To 650 grams of the above prepared polyester were added 350 grams of styrene, 0.1 gram of methyl hydroquinone, and 10 grams of benzoin methyl ether to form a polyester resin-styrene composition.

A base composition was prepared by admixing 33.08 grams of the above described polyester resin-styrene composition, 33.08 grams of silica, 38.2 grams of barium sulfate and 1 percent of methyl ethyl ketone peroxide catalyst.

A topcoat composition was formed comprising 100 parts of titanium dioxide pigment and 143 parts of the polyester resin-styrene composition described above. This amounted to a 41.2 percent pigment in the composition. The effect of the pigment content on gloss properties was shown by comparing the above topcoat composition with other topcoat composition of the same materials having 10.3 percent pigment and 2.6 percent pigment.

The base composition was coated onto tin-free steel panels with a No. 14 bar and subjected to two passes under the ultraviolet light at 50 feet per minute using the mercury lamp in a nitrogen atmosphere. The gelled base coat was then topcoated with the pigmented topcoat compositions in which no methyl ethyl ketone peroxide was added. The coating technique was the same used to coat the base coat onto the substrate. The three topcoats were completely cured with 10, seven, and five passes, respectively, of ultraviolet light at 15 feet per minute using a mercury lamp in a nitrogen atmosphere.

The coated panels were tested for hardness and gloss using the 60° glossmeter and the pencil hardness test.

The results were as follows:

Table 1

|  | Passes | 60° Gloss | Pencil Hardness |
| --- | --- | --- | --- |
| Material with 41.2% pigment | 10 | 2 | F |
| Material with 10.3% pigment | 7 | 4 | H |
| Material with 2.6% pigment | 5 | 56 | 3H |
| Material with 41.2% pigment and 1% methyl ethyl ketone peroxide | Heat Cure 30 minutes at 150°F. | 95 | HB |

EXAMPLES 2 TO 4

A polyester was formed by charging a vessel with 980 grams of maleic anhydride, 1480 grams of phthalic anhydride, 1612 grams of propylene glycol and 0.41 gram of methyl hydroquinone. The reactants were heated at a temperature of 210°C. for 7½ hours, the polyester had an acid number of 46.5 and a Gardner-Holdt viscosity of H.

To 650 grams of the above prepared polyester were added 350 grams of styrene, 0.1 gram of methyl hydroquinone, 10 grams of benzoin methyl ether, 1 gram of trimethyl benzyl ammonium chloride and 2 cubic centimeters of 12 percent cobalt octoate to form a polyester resin-styrene composition.

Topcoat compositions comprising 100 parts of $TiO_2$ and 143 parts of the polyester resin-styrene composition were applied to base coats of the same composition as that of Example 1 which were gelled using different ultraviolet conditions. The topcoatings were subjected to 10 passes under the ultraviolet lamp at 15 feet per minute each pass. The following table gives the result of the hardness and gloss readings of the resulting films:

Table 2

| Example | Number of Passes of Base Film Under UV | Speed of Base Resin Under UV | Pencil Hardness | 60° Gloss Reading |
|---|---|---|---|---|
| 2 | 2 | 50 feet per minute | F | 2 |
| 3 | 1 | 15 feet per minute | HB | 3 |
| 4 | 2 | 15 feet per minute | HB | 3 |

The above were compared with the same topcoat composition without the base coat and, hence, without catalyst. After subjecting the topcoat composition to 10 passes at 15 feet per minute under the ultraviolet lamp in a nitrogen atmosphere, the film had a 60° gloss reading of 3, but a pencil hardness of 6 B indicating no cure.

Although specific examples of the instance invention have been set forth hereinabove, it is not intended that the invention be limited solely thereto, but to include all the variations and modifications following within the scope of the appended claims.

We claim:
1. A method comprising:
   a. applying to a substrate a first coating composition comprising an ethylenically unsaturated polyester, an ethylenically unsaturated monomer and from about 0.1 to about 10 percent by weight based upon the interpolymerizable materials present, of a peroxide catalyst to form a coating thereon having an outer surface;
   b. treating said coating with enough ultraviolet light to gel said coating to a state wherein said outer surface is at least hard enough so that it does not intermix with a wet second coating composition applied thereto;
   c. applying as a coating to said outer surface of said gelled coating a catalyst-free second coating composition comprising an ethylenically unsaturated polyester and an ethylenically unsaturated monomer and at least about 5 percent by weight ultraviolet light absorbing pigment to form a composite coating; and
   d. treating said composite coating with ultraviolet light to obtain a durable cured composite coating having resistance to solvent attack and a lower gloss than a coating of said catalyst-free second coating composition when cured in like manner but in the absence of said gelled first composition.

2. The method of claim 1 wherein the second composition also comprises an accelerator for the room temperature cure of unsaturated polyester resins.

3. The method of claim 2 wherein the accelerator is a cobalt salt.

4. The method of claim 1 wherein the ethylenically unsaturated monomer is styrene.

5. The method of claim 1 wherein the peroxide catalyst is methyl ethyl ketone peroxide.

6. The method of claim 1 wherein the ultraviolet light absorbing pigment is $TiO_2$.

7. The method of claim 1 wherein the second material also comprises a photosensitizer.

8. The method of claim 7 wherein the photosensitizer is benzoin methyl ether.

* * * * *